(12) United States Patent
Rand

(10) Patent No.: US 10,848,886 B2
(45) Date of Patent: *Nov. 24, 2020

(54) ALWAYS-ON DETECTION SYSTEMS

(71) Applicant: Cirrus Logic International Semiconductor Ltd., Edinburgh (GB)

(72) Inventor: Robert David Rand, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,037

(22) Filed: Sep. 5, 2019

(65) Prior Publication Data
US 2019/0394592 A1    Dec. 26, 2019

Related U.S. Application Data

(63) Continuation of application No. 15/875,175, filed on Jan. 19, 2018, now Pat. No. 10,455,339.

(51) Int. Cl.
*H04R 29/00* (2006.01)
*G10L 15/22* (2006.01)
(Continued)

(52) U.S. Cl.
CPC ............ *H04R 29/001* (2013.01); *G10L 15/08* (2013.01); *G10L 15/22* (2013.01);
(Continued)

(58) Field of Classification Search
CPC ........ H04R 29/001; H04R 3/00; H04R 29/00; H04R 2203/00; H04R 2400/03;
(Continued)

(56) References Cited

U.S. PATENT DOCUMENTS

| 4,902,136 A | 2/1990 | Mueller et al. |
| 5,684,722 A | 11/1997 | Thorner et al. |

(Continued)

FOREIGN PATENT DOCUMENTS

| AU | 2002347829 | 4/2003 |
| CN | 103165328 A | 6/2013 |

(Continued)

OTHER PUBLICATIONS

International Search Report and Written Opinion of the International Searching Authority, International Application No. PCT/GB2019/050964, dated Sep. 3, 2019.

(Continued)

*Primary Examiner* — Andrew L Sniezek
(74) *Attorney, Agent, or Firm* — Jackson Walker L.L.P.

(57) ABSTRACT

The present disclosure relates to a system for providing an acknowledgement output at an output transducer of a device in response to detection of a trigger signal. The system includes an input transducer, a signal processor, a main processor separate from the signal processor and an output driver. The signal processor monitors an input signal received at the signal processor from the input transducer and outputs an acknowledgement signal to the output driver if the received input signal corresponds to the trigger signal. The signal processor also outputs an interrupt signal to the main processor to cause the main processor to enter an active state. In this way an acknowledgement output can rapidly be provided to a user of the system, as there is no need to wait until the main processor has entered its active state and processed the trigger signal.

17 Claims, 3 Drawing Sheets

(51) Int. Cl.
*G10L 15/08* (2006.01)
*G11B 20/10* (2006.01)
*H04R 3/00* (2006.01)
*G08B 6/00* (2006.01)
*G10L 25/48* (2013.01)
*G10L 25/78* (2013.01)
*H04R 27/00* (2006.01)

(52) U.S. Cl.
CPC ......... *G11B 20/10527* (2013.01); *H04R 3/00* (2013.01); *H04R 3/005* (2013.01); *G08B 6/00* (2013.01); *G10L 25/48* (2013.01); *G10L 25/78* (2013.01); *G10L 2015/088* (2013.01); *G10L 2015/223* (2013.01); *G11B 2020/10546* (2013.01); *H04R 27/00* (2013.01); *H04R 29/00* (2013.01); *H04R 2203/00* (2013.01); *H04R 2400/03* (2013.01); *H04R 2499/11* (2013.01)

(58) Field of Classification Search
CPC .... H04R 3/005; H04R 27/00; H04R 2499/11; G10L 15/08; G10L 15/22; G10L 25/48; G10L 25/78; G10L 2015/088; G10L 2015/223; G11B 20/10527; G11B 2020/10546; G08B 6/00
See application file for complete search history.

(56) References Cited

U.S. PATENT DOCUMENTS

| | | |
|---|---|---|
| 5,748,578 A | 5/1998 | Schell |
| 5,857,986 A | 1/1999 | Moriyasu |
| 6,050,393 A | 4/2000 | Murai et al. |
| 6,278,790 B1 | 8/2001 | Davis et al. |
| 6,332,029 B1 | 12/2001 | Azima et al. |
| 6,388,520 B2 | 5/2002 | Wada et al. |
| 6,580,796 B1 | 6/2003 | Kuroki |
| 6,683,437 B2 | 1/2004 | Tierling |
| 6,703,550 B2 | 3/2004 | Chu |
| 6,762,745 B1 | 7/2004 | Braun et al. |
| 6,906,697 B2 | 6/2005 | Rosenberg |
| 7,154,470 B2 | 12/2006 | Tierling |
| 7,623,114 B2 | 11/2009 | Rank |
| 7,639,232 B2 | 12/2009 | Grant et al. |
| 7,791,588 B2 | 9/2010 | Tierling et al. |
| 7,979,146 B2 | 7/2011 | Ullrich et al. |
| 8,068,025 B2 | 11/2011 | Devenyi et al. |
| 8,098,234 B2 | 1/2012 | Lacroix et al. |
| 8,102,364 B2 | 1/2012 | Tierling |
| 8,325,144 B1 | 12/2012 | Tierling et al. |
| 8,427,286 B2 | 4/2013 | Grant et al. |
| 8,466,778 B2 | 6/2013 | Hwang et al. |
| 8,480,240 B2 | 7/2013 | Kashiyama |
| 8,572,293 B2 | 10/2013 | Cruz-Hernandez et al. |
| 8,572,296 B2 | 10/2013 | Cruz-Hernandez et al. |
| 8,593,269 B2 | 11/2013 | Grant et al. |
| 8,648,829 B2 | 2/2014 | Shahoian et al. |
| 8,659,208 B1 | 2/2014 | Rose et al. |
| 8,754,757 B1 | 6/2014 | Ullrich et al. |
| 8,947,216 B2 | 2/2015 | Da Costa et al. |
| 8,981,915 B2 | 3/2015 | Birnbaum et al. |
| 8,994,518 B2 | 3/2015 | Gregorio et al. |
| 9,030,428 B2 | 5/2015 | Fleming |
| 9,063,570 B2 | 6/2015 | Weddle et al. |
| 9,083,821 B2 | 7/2015 | Hughes |
| 9,092,059 B2 | 7/2015 | Bhatia |
| 9,117,347 B2 | 8/2015 | Matthews |
| 9,128,523 B2 | 9/2015 | Buuck et al. |
| 9,164,587 B2 | 10/2015 | Da Costa et al. |
| 9,196,135 B2 | 11/2015 | Shah et al. |
| 9,248,840 B2 | 2/2016 | Truong |
| 9,329,721 B1 | 5/2016 | Buuck et al. |
| 9,354,704 B2 | 5/2016 | Lacroix et al. |
| 9,368,005 B2 | 6/2016 | Cruz-Hernandez et al. |
| 9,489,047 B2 | 11/2016 | Jiang et al. |
| 9,507,423 B2 | 11/2016 | Gandhi et al. |
| 9,513,709 B2 | 12/2016 | Gregorio et al. |
| 9,520,036 B1 | 12/2016 | Buuck et al. |
| 9,588,586 B2 | 3/2017 | Rihn |
| 9,640,047 B2 | 5/2017 | Choi et al. |
| 9,652,041 B2 | 5/2017 | Jiang et al. |
| 9,697,450 B1 | 7/2017 | Lee |
| 9,842,476 B2 | 12/2017 | Rihn et al. |
| 9,864,567 B2 | 1/2018 | Seo |
| 9,881,467 B2 | 1/2018 | Levesque |
| 9,946,348 B2 | 4/2018 | Ullrich et al. |
| 9,959,744 B2 | 5/2018 | Koskan et al. |
| 10,032,550 B1 | 7/2018 | Zhang et al. |
| 10,055,950 B2 | 8/2018 | Saboune et al. |
| 10,074,246 B2 | 9/2018 | Da Costa et al. |
| 10,110,152 B1 | 10/2018 | Hajati |
| 10,175,763 B2 | 1/2019 | Shah |
| 10,447,217 B2 | 10/2019 | Zhao et al. |
| 10,564,727 B2 | 2/2020 | Billington et al. |
| 10,620,704 B2 | 4/2020 | Rand et al. |
| 10,732,714 B2 | 8/2020 | Rao et al. |
| 2002/0018578 A1 | 2/2002 | Burton |
| 2003/0068053 A1 | 4/2003 | Chu |
| 2003/0214485 A1 | 11/2003 | Roberts |
| 2006/0028095 A1 | 2/2006 | Maruyama et al. |
| 2006/0284856 A1 | 12/2006 | Soss |
| 2008/0293453 A1 | 11/2008 | Atlas et al. |
| 2008/0316181 A1 | 12/2008 | Nurmi |
| 2009/0079690 A1 | 3/2009 | Watson et al. |
| 2009/0088220 A1 | 4/2009 | Persson |
| 2009/0102805 A1 | 4/2009 | Meijer et al. |
| 2009/0153499 A1 | 6/2009 | Kim et al. |
| 2010/0141408 A1 | 6/2010 | Doy et al. |
| 2010/0141606 A1 | 6/2010 | Bae et al. |
| 2011/0141052 A1 | 6/2011 | Bernstein et al. |
| 2011/0167391 A1 | 7/2011 | Momeyer et al. |
| 2012/0105358 A1 | 5/2012 | Momeyer |
| 2012/0206246 A1 | 8/2012 | Cruz-Hernandez et al. |
| 2012/0206247 A1 | 8/2012 | Bhatia et al. |
| 2012/0229264 A1 | 9/2012 | Company Bosch et al. |
| 2012/0306631 A1 | 12/2012 | Hughes |
| 2013/0027359 A1 | 1/2013 | Schevin et al. |
| 2013/0127755 A1 | 5/2013 | Lynn et al. |
| 2013/0141382 A1 | 6/2013 | Simmons et al. |
| 2013/0275058 A1 | 10/2013 | Awad |
| 2013/0289994 A1 | 10/2013 | Newman et al. |
| 2014/0056461 A1 | 2/2014 | Afshar |
| 2014/0064516 A1 | 3/2014 | Cruz-Hernandez et al. |
| 2014/0079248 A1 | 3/2014 | Short et al. |
| 2014/0085064 A1 | 3/2014 | Crawley et al. |
| 2014/0139327 A1 | 5/2014 | Bau et al. |
| 2014/0292501 A1 | 10/2014 | Lim et al. |
| 2014/0340209 A1 | 11/2014 | Lacroix et al. |
| 2015/0070260 A1 | 3/2015 | Saboune et al. |
| 2015/0084752 A1 | 3/2015 | Heubel et al. |
| 2015/0216762 A1 | 8/2015 | Oohashi et al. |
| 2015/0324116 A1 | 11/2015 | Marsden et al. |
| 2015/0341714 A1 | 11/2015 | Ahn et al. |
| 2016/0074278 A1 | 3/2016 | Muench et al. |
| 2016/0132118 A1 | 5/2016 | Park et al. |
| 2016/0162031 A1 | 6/2016 | Westerman et al. |
| 2016/0179203 A1 | 6/2016 | Modarres et al. |
| 2016/0239089 A1 | 8/2016 | Taninaka et al. |
| 2016/0246378 A1 | 8/2016 | Sampanes et al. |
| 2016/0358605 A1 | 12/2016 | Ganong, III et al. |
| 2017/0052593 A1 | 2/2017 | Jiang et al. |
| 2017/0078804 A1 | 3/2017 | Guo et al. |
| 2017/0083096 A1 | 3/2017 | Rihn et al. |
| 2017/0153760 A1 | 6/2017 | Chawda et al. |
| 2017/0256145 A1 | 9/2017 | Macours et al. |
| 2017/0277350 A1 | 9/2017 | Wang et al. |
| 2017/0357440 A1 | 12/2017 | Tse |
| 2018/0059733 A1 | 3/2018 | Gault et al. |
| 2018/0059793 A1 | 3/2018 | Hajati |
| 2018/0074637 A1 | 3/2018 | Rosenberg et al. |
| 2018/0082673 A1 | 3/2018 | Tzanetos |
| 2018/0084362 A1 | 3/2018 | Zhang et al. |
| 2018/0151036 A1 | 5/2018 | Cha et al. |

(56) References Cited

U.S. PATENT DOCUMENTS

| | | |
|---|---|---|
| 2018/0158289 A1 | 6/2018 | Vasilev et al. |
| 2018/0160227 A1 | 6/2018 | Lawrence et al. |
| 2018/0178114 A1 | 6/2018 | Mizuta et al. |
| 2018/0182212 A1 | 6/2018 | Li et al. |
| 2018/0183372 A1 | 6/2018 | Li et al. |
| 2018/0237033 A1 | 8/2018 | Hakeem et al. |
| 2018/0253123 A1 | 9/2018 | Levesque et al. |
| 2018/0294757 A1 | 10/2018 | Feng et al. |
| 2018/0301060 A1 | 10/2018 | Israr et al. |
| 2018/0321748 A1 | 11/2018 | Rao et al. |
| 2018/0329172 A1 | 11/2018 | Tabuchi |
| 2018/0367897 A1 | 12/2018 | Bjork et al. |
| 2019/0227628 A1 | 1/2019 | Rand et al. |
| 2019/0064925 A1 | 2/2019 | Kim et al. |
| 2019/0073078 A1 | 3/2019 | Sheng et al. |
| 2019/0103829 A1 | 4/2019 | Vasudevan et al. |
| 2019/0138098 A1 | 5/2019 | Shah |
| 2019/0206396 A1* | 7/2019 | Chen .................. G06F 21/32 |
| 2019/0215349 A1 | 7/2019 | Adams et al. |
| 2019/0114496 A1 | 8/2019 | Lesso |
| 2019/0294247 A1 | 9/2019 | Hu et al. |
| 2019/0296674 A1 | 9/2019 | Janko et al. |
| 2019/0297418 A1 | 9/2019 | Stahl |
| 2019/0311590 A1 | 10/2019 | Doy et al. |
| 2019/0341903 A1 | 11/2019 | Kim |

FOREIGN PATENT DOCUMENTS

| | | |
|---|---|---|
| EP | 0784844 B1 | 6/2005 |
| EP | 2363785 A1 | 9/2011 |
| EP | 2600225 A1 | 6/2013 |
| EP | 2846218 A1 | 3/2015 |
| EP | 2846329 A1 | 3/2015 |
| EP | 3125508 A1 | 2/2017 |
| EP | 3379382 A1 | 9/2018 |
| IN | 201747044027 | 8/2018 |
| JP | H02130433 B2 | 5/1990 |
| JP | 6026751 B2 | 11/2016 |
| JP | 6250985 | 12/2017 |
| JP | 6321351 | 5/2018 |
| KR | 20120126446 A | 11/2012 |
| WO | 2013104919 A1 | 7/2013 |
| WO | 2013186845 A1 | 12/2013 |
| WO | 2014018086 A1 | 1/2014 |
| WO | 2016105496 A1 | 6/2016 |
| WO | 2016164193 A1 | 10/2016 |
| WO | 2017113651 A1 | 7/2017 |
| WO | 2018053159 A1 | 3/2018 |

OTHER PUBLICATIONS

International Search Report and Written Opinion of the International Searching Authority, International Application No. PCT/GB2019/050770, dated Jul. 5, 2019.
Communication Relating to the Results of the Partial International Search, and Provisional Opinion Accompanying the Partial Search Result, of the International Searching Authority, International Application No. PCT/US2018/031329, dated Jul. 20, 2018.
Combined Search and Examination Report, UKIPO, Application No. GB1720424.9, dated Jun. 5, 2018.
International Search Report and Written Opinion of the International Searching Authority, International Application No. PCT/US2020/023342, dated Jun. 9, 2020.
International Search Report and Written Opinion of the International Searching Authority, International Application No. PCT/GB2020/050823, dated Jun. 30, 2020.
International Search Report and Written Opinion of the International Searching Authority, International Application No. PCT/US2020/024864, dated Jul. 6, 2020.
International Search Report and Written Opinion of the International Searching Authority, International Application No. PCT/GB2020/051037, dated Jul. 9, 2020.
Communication Relating to the Results of the Partial International Search, and Provisional Opinion Accompanying the Partial Search Result, of the International Searching Authority, International Application No. PCT/GB2020/050822, dated Jul. 9, 2020.
International Search Report and Written Opinion of the International Searching Authority, International Application No. PCT/GB2020/051035, dated Jul. 10, 2020.
International Search Report and Written Opinion of the International Searching Authority, International Application No. PCT/GB2020/050822, dated Aug. 31, 2020.
International Search Report and Written Opinion of the International Searching Authority, International Application No. PCT/GB2020/051438, dated Sep. 28, 2020.

* cited by examiner

ALWAYS-ON DETECTION SYSTEMS

REFERENCE TO PREVIOUSLY-FILED APPLICATION

The present disclosure is a continuation of U.S. Non-provisional patent application Ser. No. 15/875,175, filed Jan. 19, 2018, which is incorporated by reference herein in its entirety.

FIELD OF THE INVENTION

The present disclosure relates to the field of always-on detection systems. In particular, the present disclosure relates to a system and method for providing an acknowledgement output in response to detection of a trigger signal in an always-on detection system.

BACKGROUND

Modern devices such as smartphones, tablet computers, smart watches, smart speakers, smart televisions and the like are increasingly being provided with voice recognition capabilities, permitting a user to issue spoken commands to the device to command it to perform particular actions. For example, a user may issue a spoken command to cause the device to commence playback of a chosen audio track, to activate, deactivate or adjust the operation of an appliance such as a lamp or television that is connected to the device, or may issue a spoken command to cause the device to retrieve information such as news, traffic or weather information from the Internet and provide a spoken summary of such information.

Typically such devices are provided with an always-on audio detection system, which is operative continually to monitor an audio input received at an audio input transducer such as a microphone of the device. The always-on audio detection system is configured to distinguish between normal conversation that is not directed at the device and spoken commands that are directed at the device. Audio input recognised as normal conversation is ignored by the device, whereas audio input that is recognised as a spoken command that is directed at the device causes the device to perform an appropriate action in response to the command.

In order to facilitate the distinction between normal conversation and spoken commands that are directed at the device, such devices typically require an audio trigger, such as a specific spoken word or phrase uttered by the user or a sound such as a handclap or whistle, to be provided by the user prior to the user issuing a spoken command. For example, if the user were simply to ask the question "What's the weather forecast for tomorrow?", the device would interpret this as normal conversation rather than a command directed at the device. However, if the user were to speak a trigger word before asking the question, e.g. uttering the phrase "Device! What's the weather forecast for tomorrow?", the device would recognise the audio trigger "Device!" and would then respond to the question "What's the weather forecast for tomorrow?" by retrieving relevant weather information from the Internet and providing a spoken summary of that information.

The always-on audio detection system is typically provided as a part of a signal processor that is separate from a main processor or application processor of the device. This arrangement enables the power consumption of the device to be reduced when not in active use, as the main or application processor can be placed in an inactive or sleep state when the device is not in active use, whilst the signal processor incorporating the always-on audio detection system, which has a lower power consumption than the main or application processor, remains on, actively monitoring the input audio signal. When the always-on audio detection system detects the audio trigger it can send an interrupt to the main or application processor to switch the main or application processor into its active or awake state in order to process the trigger signal and respond to a subsequently detected user command.

One problem that can arise in such arrangements is that once the always-on audio detection system has detected the audio trigger, it must send the audio trigger and any subsequent command to the main or application processor, which transmits the audio trigger and command to a remote server via the Internet for verification of the audio trigger, i.e. confirmation that the audio trigger is a valid audio trigger. Only after this confirmation has been received by the device does the device acknowledge to the user that the command has been accepted, typically by outputting a specific audio tone. This causes a delay between the user issuing a command and receiving confirmation that the command has been accepted. The delay is variable but can be as much as 2-6 seconds. As will be appreciated, in the absence of a rapid confirmation that a command has been accepted, a user may re-issue the command, perhaps multiple times, until confirmation is provided that the command has been accepted. This can lead to multiple instances of the command being accepted and responded to, which may cause confusion and frustration to the user.

SUMMARY

According to a first aspect, the invention provides a system for providing an acknowledgement output at an output transducer of a device in response to detection of a trigger signal, the system comprising: an input transducer; a signal processor coupled to the input transducer; a main processor separate from the signal processor; and an output driver, wherein the signal processor is configured to: monitor an input signal received at the signal processor from the input transducer; and if the received input signal corresponds to the trigger signal: output an acknowledgement signal to the output driver to cause the output driver to drive the output transducer to output the acknowledgement output; and output an interrupt signal to the main processor to cause the main processor to enter an active state.

In the system of the first aspect an acknowledgement that a trigger signal issued by the user has been received is output by the system without any need to wait for the main processor to enter its active state to process the trigger signal, thereby rapidly informing the user that the trigger input has been received.

The input transducer may be an audio input transducer, and the signal processor may be configured to monitor an audio input signal received at the signal processor from the audio input transducer.

The signal processor may comprise an always-on audio detection system configured to monitor the audio input signal received at the signal processor from the audio input device.

The system may further comprise a memory, and the memory may be configured to store one or more acknowledgement signals corresponding to the acknowledgement output.

The one or more acknowledgement signals corresponding to the acknowledgement output may comprise one or more of: an audio acknowledgement signal or waveform; a haptic acknowledgement signal or waveform; and a visual acknowledgement signal.

The output driver may comprise a haptic output driver and the acknowledgement output may comprise a haptic output, and the signal processor may be configured to output a haptic acknowledgement signal to the haptic output driver.

The output driver may comprise an audio output driver and the acknowledgement output may comprise an audio output, and the signal processor may be configured to output an audio acknowledgement signal to the audio output driver.

The output driver may comprise a visual output driver and the acknowledgement output may comprise a visual output, and the signal processor may be configured to output a visual acknowledgement signal to the visual output driver.

The memory may be on-board memory of the signal processor.

The main processor may be configured to enter an inactive state when not in use.

The trigger signal may be a voice command.

The system according may further comprise a buffer, and the buffer may be configured to store audio input received by the audio input transducer after the trigger signal has been received, and the system may be configured to transmit the contents of the buffer to the main processor after the main processor has entered its active state.

A further aspect of the invention provides a method for providing an acknowledgement output at an output transducer of a device in response to detection of a trigger signal, the method comprising: monitoring, at a signal processor, an input signal received at the signal processor from an input transducer; and if the received input signal corresponds to the trigger signal: outputting, from the signal processor, an acknowledgement signal to an output driver of the device to cause the output driver to drive the output transducer to output the acknowledgement output; and outputting, from the signal processor, an interrupt signal, to cause a main processor of the device to enter an active state.

The input transducer may be an audio input transducer and the method may further comprise monitoring, at the signal processor, an audio input signal received at the signal processor from the audio input transducer.

The signal processor may comprise an always-on audio detection system configured to monitor the audio input signal received at the signal processor from the audio input device.

The method may further comprise storing, in a memory, one or more acknowledgement signals corresponding to the acknowledgement output.

The one or more acknowledgement signals corresponding to the acknowledgement output may comprise one or more of: an audio acknowledgement signal or waveform; a haptic acknowledgement signal or waveform; and a visual acknowledgement signal.

The output driver may comprise a haptic output driver and the acknowledgement output may comprise a haptic output, and the method may comprise outputting, by the signal processor, a haptic acknowledgement signal to the haptic output driver.

The output driver may comprise an audio output driver and the acknowledgement output may comprise an audio output, and the method may comprise outputting, by the signal processor, an audio acknowledgement signal to the audio output driver.

The output driver may comprise a visual output driver and the acknowledgement output may comprise a visual output, and the method comprise outputting, by the signal processor, a visual acknowledgement signal to the visual output driver.

The memory may be on-board memory of the signal processor.

The method may comprise causing the main processor to enter an inactive state when not in use.

The trigger signal may be a voice command.

The method may further comprise storing, in a buffer, audio input received by the audio input transducer after the trigger signal has been received, and transmitting the contents of the buffer to the main processor after the main processor has entered its active state.

A further aspect of the invention provides a signal processor for providing an acknowledgement output at an output transducer of a device in response to detection of a trigger signal, wherein the signal processor is configured to: monitor an input signal received at the signal processor from an input transducer; and if the received input signal corresponds to the trigger signal: output an acknowledgement signal to an output driver of the device to cause the output driver to drive the output transducer to output the acknowledgement output; and output an interrupt signal to cause a main processor of the device to enter an active state.

The input transducer may be an audio input transducer and the signal processor may be configured to monitor an audio input signal received at the signal processor from the audio input transducer.

The signal processor may comprise an always-on audio detection system configured to monitor the audio input signal received at the signal processor from the audio input device.

The output driver may comprise a haptic output driver and the acknowledgement output may comprise a haptic output, and the signal processor may be configured to output a haptic acknowledgement signal to the haptic output driver.

The output driver may comprise an audio output driver and the acknowledgement output may comprise an audio output, and the signal processor may be configured to output an audio acknowledgement signal to the audio output driver.

The output driver may comprise a visual output driver and the acknowledgement output may comprise a visual output, and the signal processor may be configured to output a visual acknowledgement signal to the visual output driver.

The signal processor may comprise a memory.

The memory may be configured to store one or more acknowledgement signals corresponding to the acknowledgement output.

The one or more acknowledgement signals corresponding to the acknowledgement output may comprise one or more of: an audio acknowledgement signal or waveform; a haptic acknowledgement signal or waveform; and a visual acknowledgement signal.

The main processor of the device may be configured to enter an inactive state when not in use.

The trigger signal may be a voice command.

The signal processor may be configured to receive the contents of a buffer after the main processor has entered its active state, the buffer being configured to store audio input received by the audio input transducer after the trigger signal has been received.

BRIEF DESCRIPTION OF THE DRAWINGS

Embodiments of the invention will now be described, strictly by way of example only, with reference to the accompanying drawings, of which.

DETAILED DESCRIPTION

Figure 1:
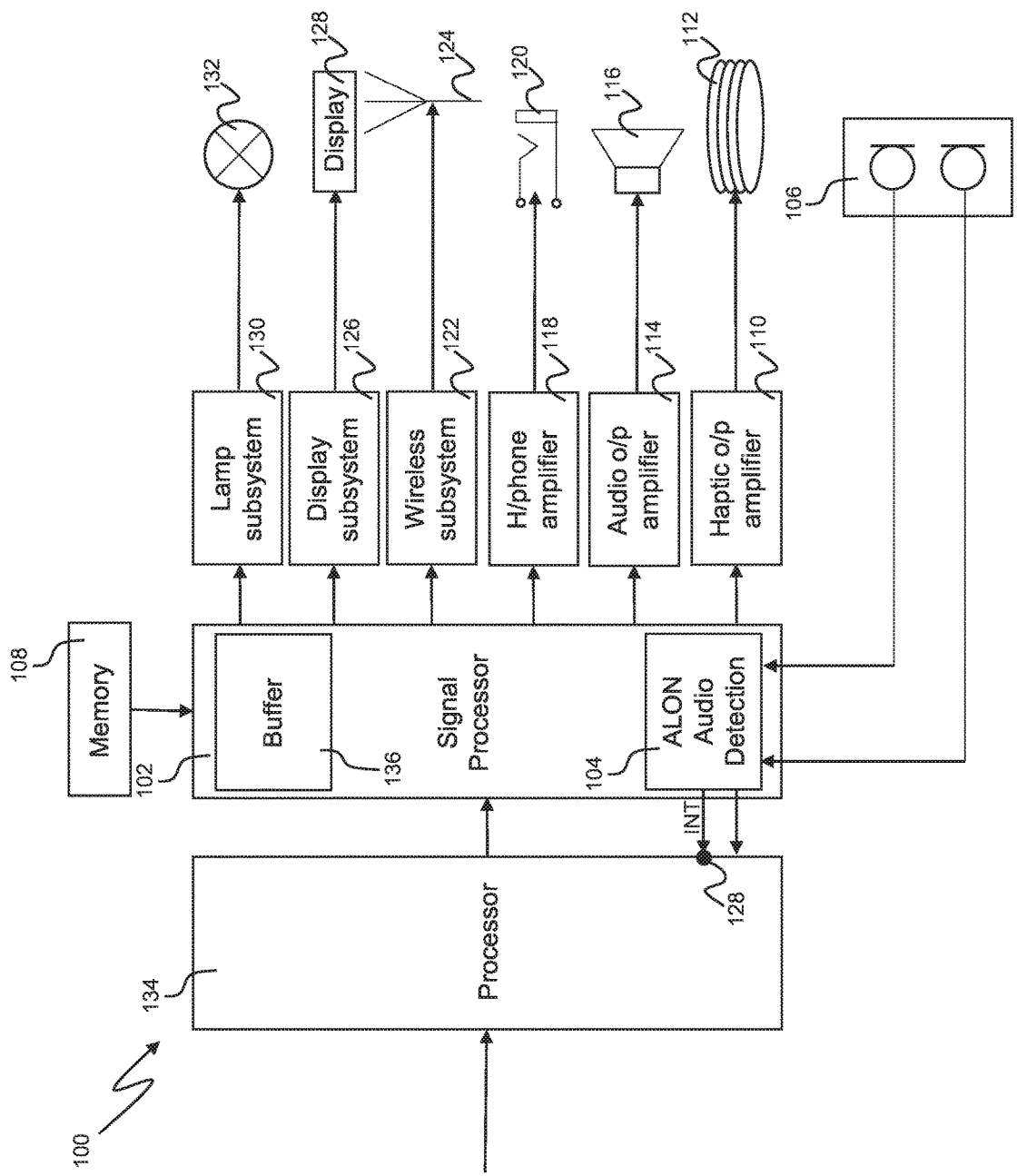
FIG. 1 is a schematic diagram showing part of a device having an always-on audio detection system.

FIG. 1 is a schematic diagram showing part of a device 100 having a signal processor 102 including an always-on audio detection system 104. The device 100 may be, for example, a mobile telephone, tablet or laptop computer, smart watch, virtual reality (VR) or augmented reality (AR) device, smart speaker or smart television. For the sake of clarity elements of the device 100 which are not relevant to the present disclosure are not shown in FIG. 1, but those skilled in the art will appreciate that the device 100 may include further elements and components in addition to those shown in FIG. 1.

The always-on audio detection system 104 is coupled to an audio input transducer arrangement 106, which in the example shown in FIG. 1 comprises a pair of microphones, such that audio from the environment surrounding the device 100 can be detected in a continuous manner.

The signal processor 102 also interfaces with a memory 108, which in the example shown in FIG. 1 is separate from the signal processor 102, but which may also form part of the signal processor 102. For example, the memory 108 may be on-board memory of the signal processor 102. The memory 108 stores haptic, audio and visual output signals that are output by the signal processor 102 to output drivers of the device, which in turn drive haptic, audio and visual output transducers of the device 100 and external accessory devices, as will be explained in further detail below.

The signal processor 102 has a first output which interfaces with a haptic output amplifier 110. The haptic output amplifier 110 is configured to drive a haptic output transducer 112, which may be, for example, a linear resonant actuator or the like.

The signal processor 102 has a second output which interfaces with an audio output amplifier 114. The audio output amplifier 114 is configured to drive an audio output transducer 116, which may be, for example, one or more loudspeakers.

The signal processor 102 may have a third output which interfaces with a headphone amplifier 118. The headphone amplifier 118 is configured to drive one or more external wired accessory devices such as headphones, earphones, earbuds or the like, which may be connected to the headphone amplifier 118 by means of a jack socket 120 which is configured to receive a corresponding plug of the external wired accessory device.

The signal processor 102 may have a fourth output which interfaces with a wireless communications subsystem 122, which is configured to generate wireless signals complying with one or more wireless communications protocols such as Bluetooth®, WiFi® or the like, for transmission to an external wireless accessory device such as, for example, a wireless headset, via an antenna 124.

The signal processor 102 may have a fifth output which interfaces with a display subsystem 126, which is configured to drive a display 128 of the device 100, which may be, for example, a touch screen display.

The signal processor 102 may have a sixth output which interfaces with a lamp subsystem 130, which is configured to drive a lamp 132 of the device 100.

The device 100 also includes a main processor 134, which may be, for example, an application processor. The main processor 134 is separate from the signal processor 102 and interfaces with the signal processor 102, to provide signals to be processed by the signal processor 102 for subsequent output by one or more of the output drivers (haptic output amplifier 110, audio output amplifier 114, headphone amplifier 118, wireless subsystem 122, display subsystem 126, or lamp subsystem 130).

To increase the power efficiency of the device 100, the main processor 134 is configured to enter an inactive or sleep state when it is not required. The signal processor 102 and the always-on audio detection system 104 remain active at all times, in order to detect audio triggers indicating that the user requires the device 100 to perform an action in response to a user command.

The processor 134 is provided with an interrupt line 128, which is coupled to an output of the always-on audio detection system 104, so that when the always-on audio detection system 104 detects an audio trigger, an interrupt signal can be input to the interrupt line 128 to cause the processor 134 to return to its active or awake state so as to process the received command, allowing the device 100 to respond appropriately.

As discussed above, known devices that respond to audio commands can suffer from a delay between a user issuing a command and the device 100 outputting an acknowledgement signal. The always-on audio detection system 104 is configured to minimize or at least reduce this delay, as will now be explained with reference to FIG. 2.

Figure 2:
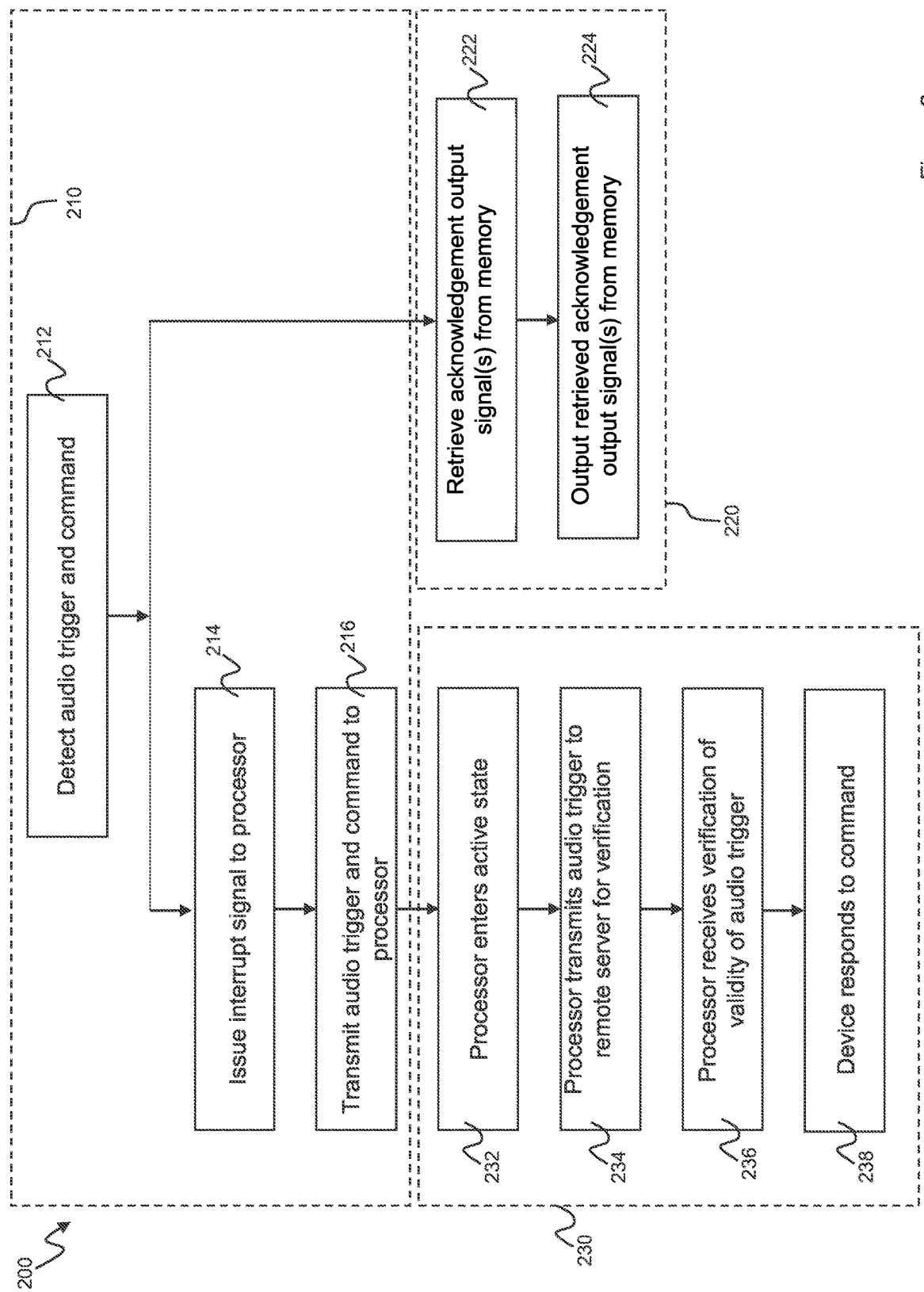
FIG. 2 is a flow chart illustrating steps performed by a signal processor to provide an acknowledgement output on detection of an audio trigger signal.

In the flow chart 200 of FIG. 2, actions performed by the always-on audio detection system 104 are shown in the box labelled 210, whilst actions performed by the signal processor 102 are shown in the box labelled 220 and actions performed by the main processor 134 are shown in the box labelled 230.

At step 212, the always-on audio detection system 104 detects an audio trigger and command. As discussed above, the audio trigger may be, for example, a specific spoken word such as "Device" or a sound such as a handclap or whistle, whilst the command may be a spoken instruction such as "Dim the living room lights" or a question, such as "What is the weather forecast for tomorrow?". In response to the detection of the audio trigger and command, the always-on audio detection system 104 issues an interrupt signal to the main processor 134 (step 214) and transmits the detected audio trigger and command to the main processor 134 (step 216).

In response to detection of the audio trigger and command by the always-on audio detection system 104, the signal processor 102 retrieves (at step 222) one or more acknowledgement output signals from the memory 108. Alternatively, the one or more acknowledgement output signals may be generated in real-time by the signal processor 102. The acknowledgement output signal(s) retrieved or generated may be dependent upon predefined settings such as user preferences, or upon output devices that are available or connected to the device 100.

For example, if the device 100 includes audio output transducer 116 and haptic output transducer 112, then the signal processor 102 may generate or retrieve from the memory 108 an audio output signal or waveform corresponding to an acknowledge audio tone to be output by the audio output transducer 116 and a haptic output signal or waveform corresponding to an acknowledge vibration effect to be output by the haptic output transducer.

Alternatively, if a wireless accessory device is connected to the device 100, the signal processor 102 may generate or retrieve from the memory 108 an audio output signal or waveform corresponding to an acknowledge audio tone to be output by an audio transducer of the wireless accessory device.

Similarly, if an external wired accessory device such as headphones, earphones or earbuds is connected to the device 100 by means of the jack socket 120, the signal processor 102 may retrieve from the memory 108 an audio output signal or waveform corresponding to an acknowledge audio tone to be output by the external wired accessory device.

If the device 100 includes display 128, then the signal processor 102 may generate or retrieve from memory 108 a video output signal corresponding to an acknowledge video signal to be output by the display 128. The acknowledge video signal may cause the display 128 to display an acknowledge image or message, or may cause a backlight of the display 128 to switch on to illuminate the display, for example.

Similarly, if the device 100 includes lamp 132, then the signal processor 102 may generate or retrieve from memory 108 a signal corresponding to an acknowledge lamp signal to be output by the lamp 132. The acknowledge lamp signal may cause the lamp 132 to switch on for a predetermined period of time, or may cause the lamp to switch on and off in a predetermined sequence, for example.

At step 224 the signal processor 102 outputs the acknowledgement output signals to the appropriate output driver(s) 110, 114, 118, 122, 126, 130, which in turn cause the appropriate acknowledge audio and/or haptic signal to be output by the audio output transducer 116 or haptic output transducer 112, or by a wired or wireless external accessory connected to the device 100 by means of the jack socket 120 or wireless subsystem 122 and antenna 124 respectively, and cause the appropriate acknowledge video or lamp signals to be output by the display 128 or lamp 132 if required.

It will be appreciated that the appropriate acknowledgement output signals may be output by the signal processor 102 to any of, or any combination of, the output drivers 110, 114, 118, 122, 126, 130.

Thus, in the event that a user has configured the device 100 to provide only haptic acknowledgement signals, the signal processor 102 may output only the haptic acknowledgement output signal, thereby causing only the haptic output transducer 112 to output an acknowledge signal.

Similarly, if the user has configured the device to output both audio and haptic acknowledgement signals, the signal processor 102 may output the haptic acknowledge signal to the haptic output amplifier 110 and may output the audio acknowledge signal to the audio output amplifier 114, such that both audio and haptic acknowledgement signals are provided to the user on detection by the always on audio detection system 104 of an audio trigger signal.

If the user has configured the device to output a video or lamp acknowledgement signal (in addition to or instead of other types of acknowledgement output signals), the signal processor 102 may output the video acknowledge signal to the display subsystem 126 and may output the lamp acknowledge signal to the lamp subsystem 130, to cause an appropriate acknowledgement output to be output by the display 128 or the lamp 132.

As a further example, if a wired accessory device is connected to the device 100 by means of the jack socket 120 or a wireless accessory device is connected to the device 100 by means of the wireless sub-system 122 and antenna 124, the signal processor 102 may output the haptic acknowledge signal to the haptic output amplifier 110 and may also output the audio acknowledge signal to the headphone amplifier 118 or wireless sub-system 122 as appropriate, so that a haptic acknowledgement signal is provided at the device 100 (via haptic output transducer 112) and an audio acknowledgement signal is provided at the connected accessory device.

While the signal processor 102 is performing steps 222 and 224 to provide a rapid acknowledgement to the user that the audio trigger and command have been received, the main processor 134, having received the audio trigger and command from the always-on audio detection system 104, enters its active or awake state (at step 232), and, at step 234, transmits the audio trigger via the Internet to a remote server for verification of the audio trigger. If the remote server verifies that the audio trigger is a valid audio trigger, it sends a verification message to the main processor 134, which is received at step 236. On receipt of this verification message, the main processor 134 causes the device 100 to respond to the command in an appropriate manner, at step 238, for example by performing an action or providing a spoken summary of information retrieved by the main processor 134 from the Internet in response to the command.

In the example described above, the received audio trigger and command are transmitted to the main processor 134 together after both the audio trigger and command have been detected. In an alternative approach, the always-on audio detection system 104 may be configured to transmit an interrupt signal to the main processor 134 to cause the main processor 134 to enter its active or awake state as soon as the audio trigger has been detected. In this case the signal processor 102 also outputs appropriate acknowledgement output signals in response to detection of the audio trigger.

In this approach, a buffer 136 (which may be provided as part of the signal processor 102, as shown in FIG. 1, or may be provided elsewhere in the device 100) is used to store audio input received by the audio input transducer arrangement 106 after the audio trigger has been received. Such subsequent audio input may correspond to a voice command issued by the user. The contents of the buffer 136 are then transmitted to the main processor 134 when the main processor 134 has entered its active or awake state in response to receiving the interrupt signal from the always-on audio detection system 104. For example, when the main processor 134 has entered its active or awake state, it may transmit a signal to the signal processor 102 indicating that it has entered its active or awake state, and in response to receiving this signal the signal processor 102 may transmit the contents of the buffer 136 to the main processor 134 for processing to execute the user's command.

It will be appreciated that the principles described above are applicable in devices in which an input transducer other than an audio input transducer is provided to detect a trigger signal that is used to indicate that the user wishes to issue a voice command to a device.

Figure 3:
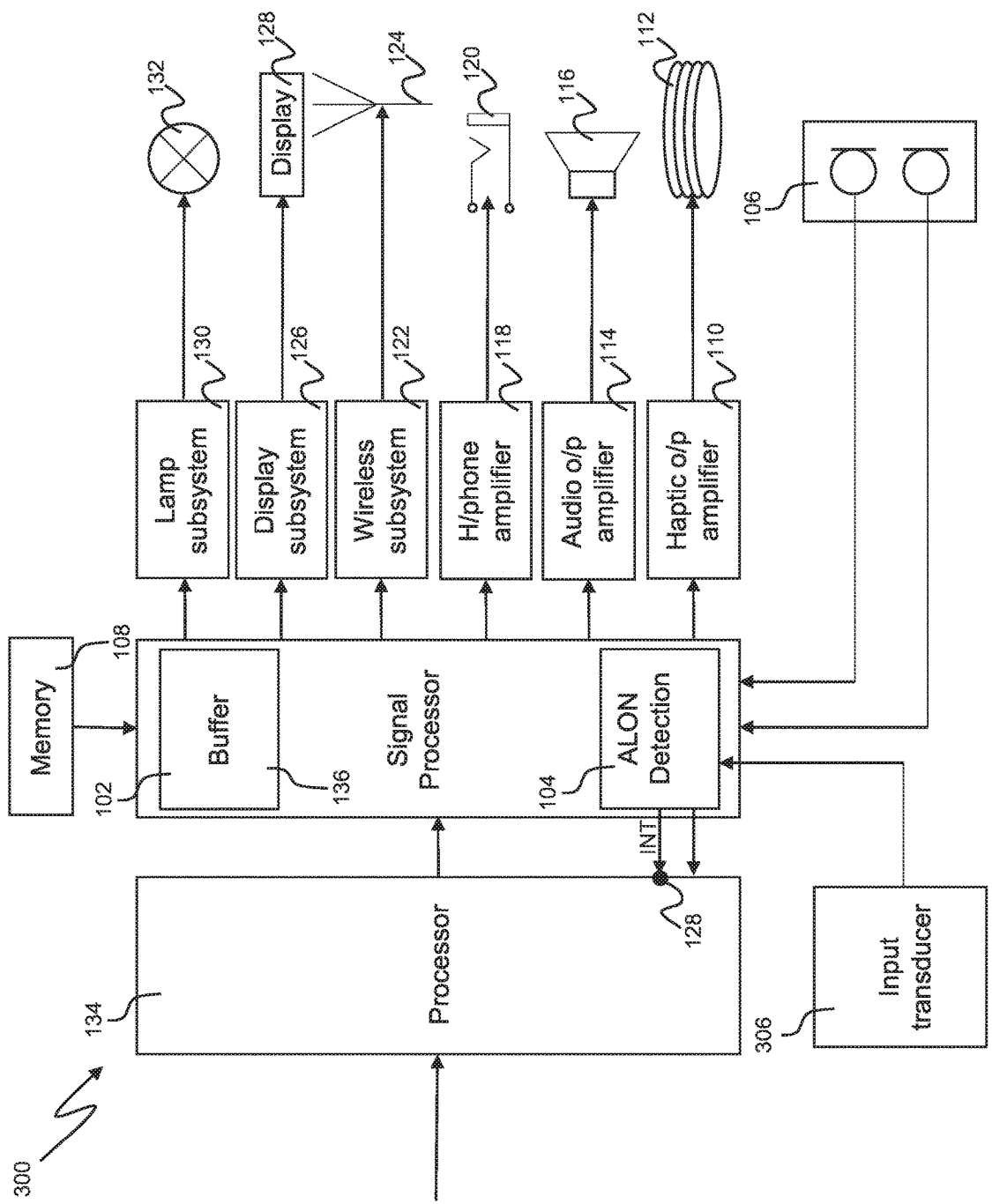
FIG. 3 is a schematic diagram showing part of a device having an always-on detection system for detecting a trigger signal.

FIG. 3 is a schematic diagram showing part of a device 300 having an always-on detection system for detecting a trigger signal indicating that a user of the device wishes to issue a voice command to the device. The device 300 of FIG. 3 is similar to the device 100 of FIG. 1, so like reference signs have been used to represent like elements, and only those elements of the device 300 of FIG. 3 that differ from the device 100 of FIG. 1 will be described here.

The device 300 of FIG. 3 differs from the device 100 of FIG. 1 in that the always-on audio detection system 104 is replaced by an always-on detection system 304 which is configured to detect a trigger signal generated by an input transducer 306 in response to a user input indicative that the user of the device 300 wishes to issue a voice command to the device. The input transducer 306 need not be an audio input transducer, but instead may be any transducer that is able to generate a trigger signal in response to a user input. The input transducer 306 may be, for example, a push switch or button, a touch sensitive surface such as a touch-screen or touch pad, a movement sensor such an accelerometer or gyroscope, or a force-sensing transducer.

The always-on detection system 304 operates in substantially the same manner as the always-on audio detection system 104 of the device 100 of FIG. 1, as described above with reference to FIG. 2. However, instead of detecting an audio trigger, the always-on detection system is configured to detect a trigger signal of a kind that is appropriate to the type of input transducer 306 that is provided.

For example, where the input transducer 306 is a button or push switch, a trigger signal may be generated by a user depressing the button or push switch. A signal output by the button or push switch may be identified by the always-on detection system 304 as a trigger signal if the duration of the signal (corresponding to the length of time for which the button or switch is depressed by the user) exceeds a predefined threshold, for example.

Where the input transducer 306 is a touch sensitive surface, a signal output by the input transducer 306 corresponding to a predefined touch or gesture on the touch sensitive surface may be identified by the always-on detection system 304 as a trigger signal.

Where the input transducer 306 is a movement sensor such an accelerometer or gyroscope, a signal output by the input transducer 306 corresponding to a predefined action such as shaking or tapping the device 300 may be identified by the always-on detection system 304 as a trigger signal.

Where the input transducer 306 is a force-sensing transducer, a signal output by the input transducer 306 corresponding to a predetermined action such as squeezing or pressing part of the device 300 may be identified by the always-on detection system 304 as a trigger signal.

The always-on detection system 304 responds to detection of an identified trigger signal by issuing an interrupt signal to the main processor 134 to cause the main processor 134 to enter its active state, and transmitting a voice command subsequently received from the user by the audio input transducer arrangement 106 to the main processor 134.

Simultaneously or subsequently, the signal processor 102 retrieves one or more acknowledgement output signals (e.g. an audio acknowledgement signal or a haptic acknowledgement signal) from the memory 108 and outputs the acknowledgement output signal(s) to one or more of the output drivers (haptic output amplifier 110, audio output amplifier 114, headphone amplifier 118 or wireless subsystem 122), thereby providing a rapid acknowledgement to the user that the trigger signal has been received by the device 300.

In response to the interrupt signal the main processor 134 enters its active or awake state and responds to the voice command in an appropriate manner, by performing an action or transmitting the providing a spoken summary of information retrieved by the main processor 134 from the Internet in response to the command.

It will be appreciated that the system described herein provides a rapid acknowledgement that a user's trigger signal and command have been received by the device 100. This rapid acknowledgement ensures that the user is aware that the device has received the trigger signal and command, thereby reducing the likelihood that the user will repeatedly issue the command, thus improving the ease of use of the device 100 and the user's experience of using the device 100.

The invention claimed is:

1. A system for providing an acknowledgement output at an output transducer of a device in response to detection of a trigger signal, the system comprising:
   an input transducer;
   a signal processor coupled to the input transducer;
   a main processor separate from the signal processor; and
   an output driver,
   wherein the signal processor is configured to:
      monitor an input signal received at the signal processor from the input transducer; and
      if the received input signal corresponds to the trigger signal:
         output an acknowledgement signal to the output driver to cause the output driver to drive the output transducer to output the acknowledgement output; and
         output an interrupt signal to the main processor to cause the main processor to enter an active state and to initiate verification that the input signal is a valid trigger signal.

2. A system according to claim 1 wherein the input transducer is an audio input transducer and wherein the signal processor is configured to monitor an audio input signal received at the signal processor from the audio input transducer.

3. A system according to claim 2 wherein the signal processor comprises an always-on audio detection system configured to monitor the audio input signal received at the signal processor from the audio input device.

4. A system according to claim 2 wherein the trigger signal is a voice command.

5. A system according to claim 2 further comprising a buffer, wherein the buffer is configured to store audio input received by the audio input transducer after the trigger signal has been received, and wherein the system is configured to transmit the contents of the buffer to the main processor after the main processor has entered its active state.

6. A system according to claim 1 further comprising a memory, wherein the memory is configured to store one or more acknowledgement signals corresponding to the acknowledgement output.

7. A system according to claim 6 wherein the one or more acknowledgement signals corresponding to the acknowledgement output comprise one or more of:
   an audio acknowledgement signal or waveform;
   a haptic acknowledgement signal or waveform; and
   a visual acknowledgement signal.

8. A system according to claim 6 wherein the memory is on-board memory of the signal processor.

9. A system according to claim 1 wherein the output driver comprises a haptic output driver and the acknowledgement output comprises a haptic output, and wherein the signal processor is configured to output a haptic acknowledgement signal to the haptic output driver.

10. A system according to claim 1 wherein the output driver comprises an audio output driver and the acknowledgement output comprises an audio output, and wherein the signal processor is configured to output an audio acknowledgement signal to the audio output driver.

11. A system according to claim 1 wherein the output driver comprises a visual output driver and the acknowledgement output comprises a visual output, and wherein the signal processor is configured to output a visual acknowledgement signal to the visual output driver.

12. A system according to claim 1 wherein the main processor is configured to enter an inactive state when not in use.

13. A signal processor for providing an acknowledgement output signal at a haptic output transducer of a device in response to detection of a trigger signal when a main processor of the device is in an inactive state, wherein the signal processor is configured to:
- monitor an input signal received at the signal processor from an input transducer; and
- if the received input signal corresponds to the trigger signal:
  - retrieve, from a memory of the device, an acknowledgement signal comprising a haptic waveform corresponding to an acknowledge effect to be output by the haptic output transducer;
  - output the acknowledgement signal to an output driver of the device to cause the output driver to drive the haptic output transducer to output the acknowledgement output; and
  - output an interrupt signal to cause the main processor of the device to enter an active state and to initiate verification that the input signal is a valid trigger signal.

14. A signal processor according to claim 13 wherein the input transducer is an audio input transducer and wherein the signal processor is configured to monitor an audio input signal received at the signal processor from the audio input transducer.

15. A signal processor according to claim 14 wherein the signal processor comprises an always-on audio detection system configured to monitor the audio input signal received at the signal processor from the audio input device.

16. A signal processor according to claim 14 wherein the trigger signal is a voice command.

17. A system for providing an acknowledgement output at a haptic output transducer of a device in response to detection of a trigger signal, the system comprising:
- an input transducer;
- a signal processor coupled to the input transducer;
- a main processor separate from the signal processor;
- an output driver; and
- a memory, wherein the memory is configured to store one or more acknowledgement signals corresponding to the acknowledgement output, wherein the signal processor is configured to:
- monitor an input signal received at the signal processor from the input transducer; and
- if the received input signal corresponds to the trigger signal:
  - retrieve, from the memory, an acknowledgement signal comprising a haptic waveform corresponding to an acknowledge effect to be output by the haptic output transducer;
  - output the acknowledgement signal to the output driver to cause the output driver to drive the haptic output transducer to output the acknowledgement output; and
  - output an interrupt signal to the main processor to cause the main processor to enter an active state and to initiate verification that the input signal is a valid trigger signal.

* * * * *